United States Patent
Shimada et al.

[11] Patent Number: 5,982,928
[45] Date of Patent: *Nov. 9, 1999

[54] CHARACTER RECOGNIZING APPARATUS AND METHOD OF CONTROLLING THE SAME

[75] Inventors: Kazutoshi Shimada, Yokosuka; Eisaku Tatsumi, Kawasaki; Shigeki Mori, Koshigaya; Kasuhiro Matsubayashi, Yokohama; Shinichi Sunakawa, Kawasaki; Takashi Harada, Yokohama; Katsuhiko Nagasaki, Ichikawa; Ryoji Fukuda, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/492,419

[22] Filed: Jun. 19, 1995

[30] Foreign Application Priority Data

Jun. 21, 1994 [JP] Japan .................................. 6-138581

[51] Int. Cl.⁶ ...................................................... G06K 9/62
[52] U.S. Cl. ............................................ 382/187; 382/309
[58] Field of Search ...................................... 382/187, 186, 382/101, 137, 185, 309, 311, 188, 189, 229

[56] References Cited

U.S. PATENT DOCUMENTS

| | | | |
|---|---|---|---|
| 4,180,798 | 12/1979 | Komori et al. | 382/181 |
| 4,759,053 | 7/1988 | Satomi et al. | 379/100 |
| 5,008,948 | 4/1991 | Tsukawaki | 382/187 |
| 5,191,622 | 3/1993 | Shojima et al. | 382/185 |
| 5,257,328 | 10/1993 | Shimizu | 382/311 |
| 5,265,174 | 11/1993 | Nakatsuka | 382/189 |
| 5,530,907 | 6/1996 | Pavey et al. | 382/309 |
| 5,546,538 | 8/1996 | Cobbley et al. | 709/203 |
| 5,644,653 | 7/1997 | Sunakawa et al. | 382/187 |
| 5,699,455 | 12/1997 | Arai et al. | 382/187 |

FOREIGN PATENT DOCUMENTS 55-134483  10/1980  Japan .

Primary Examiner—Jon Chang
Attorney, Agent, or Firm—Fitzpatrick, Cella, Harper & Scinto

[57] ABSTRACT

A system consisting of a plurality of terminals connected through communication is sometimes used to acquire information input from the terminals to a host terminal and edit/arrange the information in the host terminal when information is exchanged by inputting handwritten characters from the terminals. In this case, the host terminal must recognize the handwritten characters and thereafter process the characters to arrange the handwritten character information. Each terminal can perform character recognition by a unique character recognizing method. The terminals also individually prepare dictionaries for recognition. The host terminal returns the acquired handwritten character information to the terminals and causes the terminals to perform character recognition. Alternatively, the host terminal concentratively manages the character recognizing methods and dictionaries of all the terminals and performs character recognition.

17 Claims, 13 Drawing Sheets

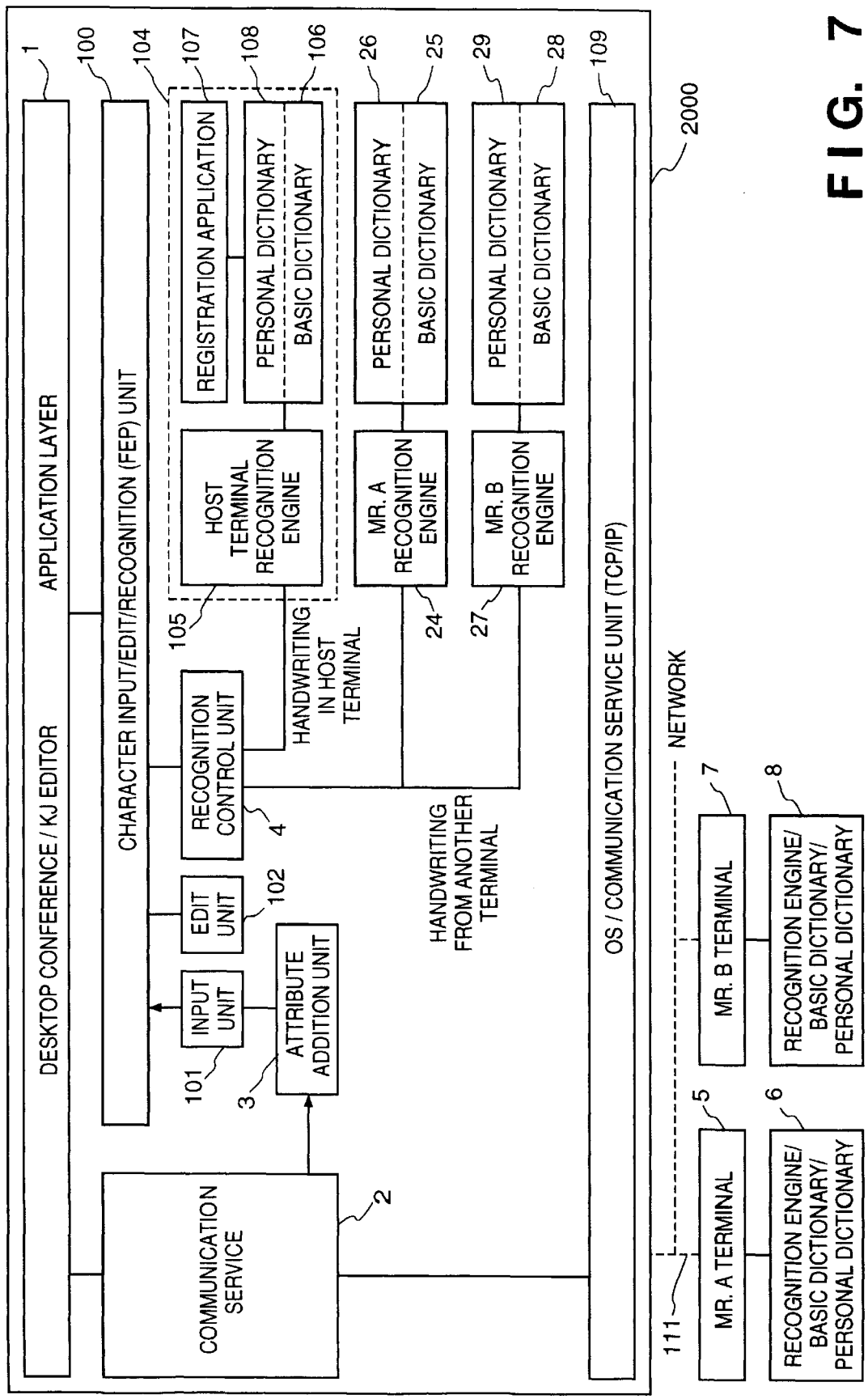

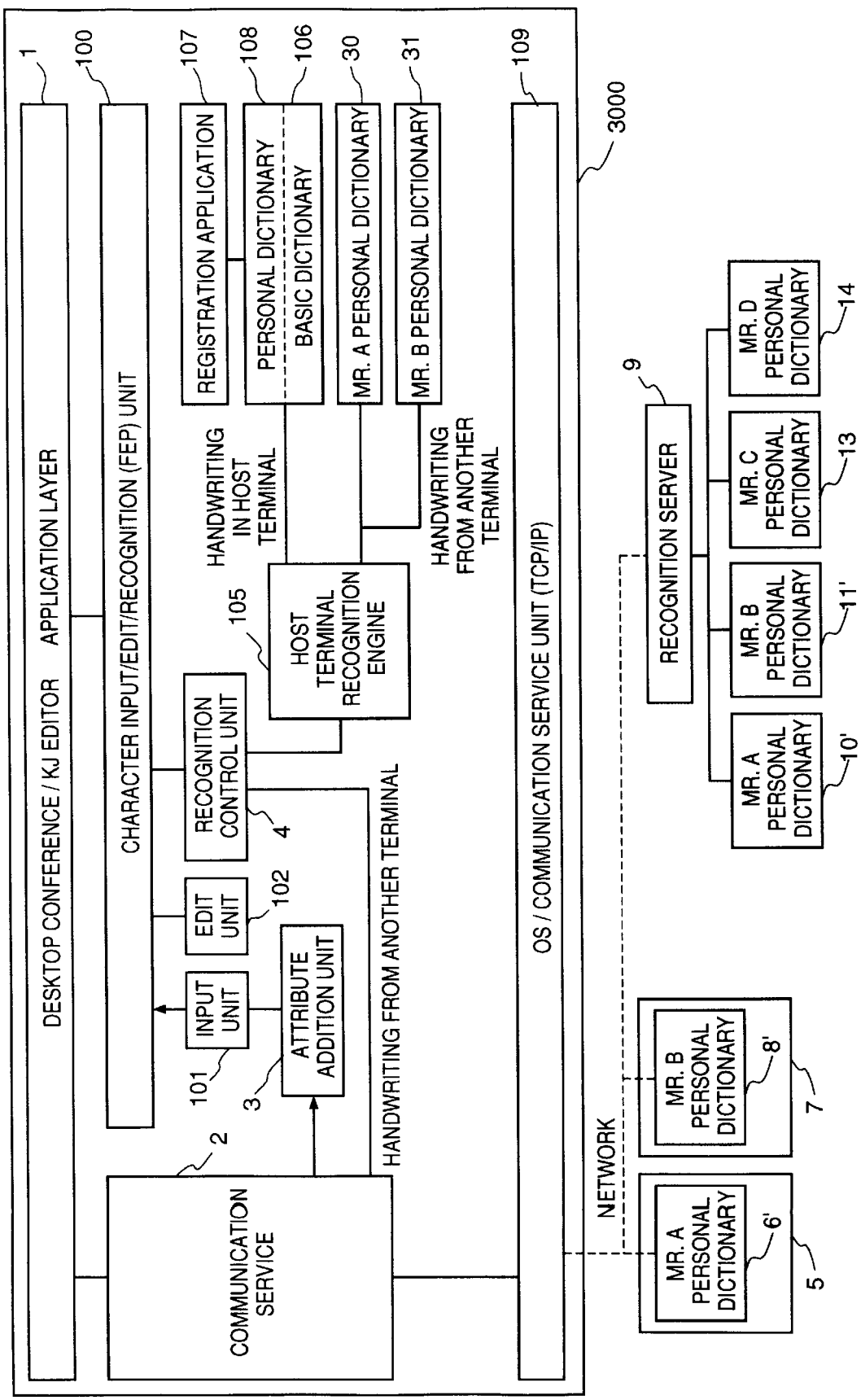

CHARACTER RECOGNIZING APPARATUS AND METHOD OF CONTROLLING THE SAME

BACKGROUND OF THE INVENTION

The present invention relates to an information equipment having a handwritten character recognition function as an input means and, more particularly, to a character recognizing apparatus connected to a line such as a network and capable of exchanging handwritten characters, and a method of controlling the same.

Recently, pen computers have received a great deal of attention through its market, however they are not in full flourish yet. As a reason for this, the handwritten character recognition rate is not so high in practice as that described in specifications. This is because an individual has a specific peculiarity in his/her handwriting, resulting in different features of characters, or one does not have enough time to carefully write characters in some cases, resulting in scrawl. Therefore, in addition to development of an algorithm for handwritten character recognition, a method of individually customizing a recognition dictionary has been developed to reflect the personality of an individual. Various methods by registration, study, and the like can be considered as customizing methods. In any case, a personal recognition dictionary is prepared in addition to a basic recognition dictionary.

FIG. 13 is a view showing the configuration of conventional character input software. Processing associated with character input is incorporated in the system as a front-end processor (FEP) 100 for integrally processing characters regardless of keyboard input or handwriting, which can be commonly used for all applications. An input unit 101 receives input information. An edit unit 102 performs "copy", "move", "delete", "insert", and the like. After a character input from a keyboard or a handwritten KANA (Japanese syllabary) character is recognized as a character, a KANA-KANJI conversion unit 103 converts the character into a KANJI (chinese character) character. A recognition unit 104 converts handwritten input information into character code information. The recognition unit 104 is constituted by a recognition engine 105, a basic dictionary 106, a registration application 107 for individually customizing recognition, and a personal dictionary 108 prepared by the registration application 107. An OS 109 is constituted by basic software such as "Windows" or "UNIX" and performs part of communication control in addition to file or memory management. An application 110 uses the above functions.

A pen computer is used for outdoor data acquisition or sales because of portability as one of its features. For this reason, data communication between an office and a visiting destination increases its importance to make a communication function essential.

In addition, along with a progress in network, information exchange by a video conference, an electronic mail, telewriting, groupware, and the like is flourishing. A computer having a pen input function, including a pen computer, has been used as a terminal for information exchange. In application software called online KJ editor, an idea obtained from one's thought is input from a computer terminal. A host terminal can observe all ideas written at the terminals and perform editing such as rearrangement or arrangement. Since handwritten character information cannot be subjected to secondary processing, character recognition must be performed to arrange the pieces of transferred handwritten character information. When the elements of a change in input coordinates with time are sent, the handwritten character data transferred through the network can be recognized by a computer having an online handwritten character recognition function.

However, handwritten characters has features largely depending on peculiarities in handwriting, as described above. For this reason, with only a basic dictionary, a satisfactory character recognition result cannot be obtained.

Furthermore, the personal dictionary is prepared depending on the recognition algorithm. However, character recognition software applications at the terminals are often of different types or versions, so the data cannot be easily exchanged.

SUMMARY OF THE INVENTION

The present invention has been made in consideration of the above prior art, and has as its object to provide a character recognizing apparatus for controlling information such that received handwritten character information to be recognized can be recognized in accordance with the recognition environment of a sender, i.e., a person who has handwritten the received characters, thereby allowing recognition depending on different individuals and improving a character recognition rate, and a method of controlling the same.

The foregoing object is attained by providing a character recognizing apparatus for recognizing a handwritten character from an input source comprises:
  input means for inputting handwritten character information together with attribute information representing the input source;
  character recognition means for recognizing the handwritten character information from the input source as a character; and
  recognition control means for determining the input source in accordance with the attribute information and causing the character recognition means to recognize the handwritten character information.

The invention further provides a character recognizing apparatus for recognizing a handwritten character from an input source comprises:
  communication means;
  input means for inputting handwritten character information from a terminal connected through the communication means together with attribute information representing the input source;
  character recognition means, distributed to the terminal serving as the input source, for recognizing the handwritten character information from the input sources as a character; and
  recognition control means for determining the input source in accordance with the attribute information and causing the character recognition means distributed to the terminal serving as the input source through the communication means to recognize the handwritten character information.

The present invention further provides a character recognition apparatus for recognizing a handwritten character from an input source comprises:
  communication means;
  input means for inputting handwritten character information from a terminal connected through the communication means together with attribute information representing the input source;
  character recognition means, connected through the communication means, for recognizing the handwritten character information from the input source as a character; and recognition control means for determining the input source in accordance with the attribute information and causing the character recognition means to recognize the handwritten character information.

The present invention further provides a character recognizing apparatus for recognizing a handwritten character from an input source comprises:

communication means;

input means for inputting handwritten character information from a terminal connected through the communication means together with attribute information representing the input source;

character recognition means for performing character recognition by the same character recognizing method as that of the terminal; and recognition control means for determining the input source in accordance with the attribute information and causing the character recognition means to recognize the handwritten character information.

Further, the foregoing object is attained by providing a method of controlling a character recognizing apparatus connected to a terminal comprises:

the step of dividing handwritten character information in accordance with attribute information representing an input source;

the step of transmitting the divided handwritten character information to the terminal in accordance with the attribute information; and the step of receiving character recognition results from the terminal.

The present invention further provides a method of controlling a character recognizing apparatus connected to a terminal comprises:

the step of receiving handwritten character information through communication;

the step of recognizing the received handwritten character information as a character; and the step of transmitting a recognition result to a transmission source of the handwritten character information.

The present invention further provides a method of controlling a character recognizing apparatus, connected to terminals, for recognizing received handwritten character information comprises:

the confirmation step of confirming a character recognition unit of the character recognizing apparatus and the connected terminals;

the step of switching personal dictionaries in accordance with an input source of the handwritten character information when it is confirmed in the confirmation step that there are a character recognition unit common to the connected terminals, and personal dictionaries of the terminals, which are different from each other;

the step of switching the character recognition units in accordance with the input source of the handwritten character information when it is confirmed in the confirmation step that there are character recognition units respectively corresponding to the terminals;

the step of requesting character recognition to the terminals when it is confirmed in the confirmation step that the terminals serving as the input source of the handwritten character information are connected; and the step of requesting character recognition to a character recognition server when it is confirmed in the confirmation step that the character recognition server having the same character recognition units as those of the connected terminals is connected.

With the above arrangements, according to the character recognizing apparatus and the method of controlling the apparatus of the present invention, handwritten characters can be recognized by a recognizing method optimized in accordance with the features of characters handwritten by a specific person. Even when data communication by handwritten characters is generated, optimal recognition can be performed, thereby improving the recognition rate.

In addition, since the recognition control unit is arranged between the conventional FEP and the recognition engine, the application can execute character recognition, as in a recognition operation in the main body, without managing the recognition process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view showing the software configuration of a character recognition system according to the second embodiment;

FIG. 9 is a view showing the software configuration of a character recognition system according to the third embodiment;

DETAILED DESCRIPTION OF THE PREFERRED EMBODIMENTS

The preferred embodiments of the present invention will be described below with reference to the accompanying drawings.

<First Embodiment>

Figure 1:
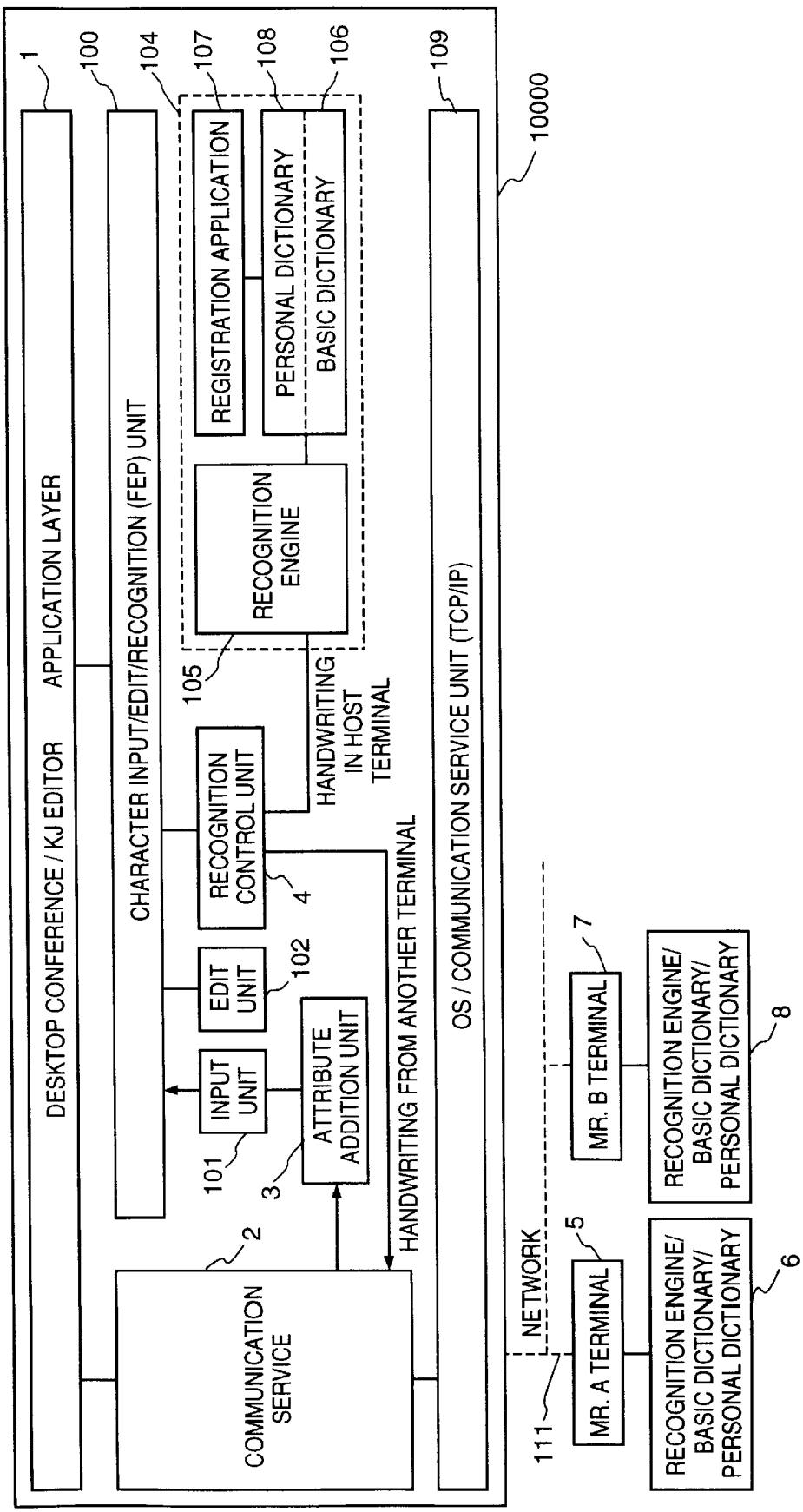
FIG. 1 is a view showing the software configuration of a character recognition system according to the first embodiment.
Figure 13:
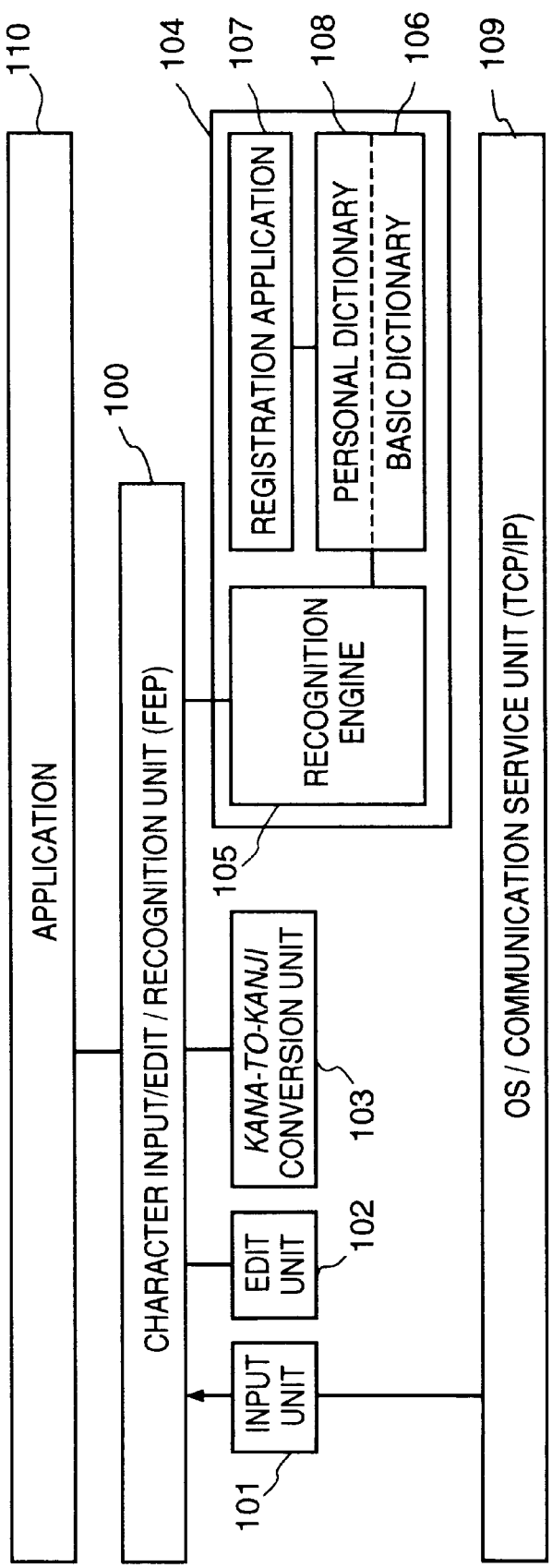
FIG. 13 is a view showing the software configuration of a conventional character recognition system.

FIG. 1 is a view showing the software configuration of a terminal device having a handwritten character recognition function, which most properly represents the characteristic features of the present invention. The entire flow will be described with reference to FIG. 1. The same reference numerals as in the prior art of FIG. 13 denote the same parts in FIG. 1.

A terminal 10000 serving as a host for acquiring data from the remaining terminals is connected to a terminal 5 used by Mr. A and a terminal 7 used by Mr. B through a network 111. These terminals have the same configuration except for personal resources. Note that the terminal 10000 serving as a host is referred to as a host terminal.

At the terminal 10000, an application 1 is application software (to be simply referred to as an application hereinafter) such as a desktop conference, a video conference, telewriting, or a KJ editor, which is held by exchanging information including handwritten character information with at least one of the remaining terminals. A communication service unit 2 provides a service for properly transferring an application command or information to terminals which are connected at multiple points or receiving information and transferring it to the application. An attribute addition unit 3 adds an attribute for identifying a sender to the received information. The received information is transferred to the application 1 through an input unit 101 and a FEP 100 as in input from the host terminal. The application 1 inputs the received information to a window for partner or a window for edition in accordance with a command or mode from the partner.

In FIG. 1, the current communication partners of the terminal 10000 are the terminal 5 of Mr. A and the terminal 7 of Mr. B, which are connected to the terminal 10000 through the network. The same application as in the host terminal 10000 runs in both the terminals 5 and 7. Recognition engines/basic dictionaries 6 for terminal 5 and 8 for terminal 7 may be the same as that of the host terminal or different from that of the host terminal. Personal dictionaries are different depending on individuals, as a matter of course. The recognition engine uses the basic and personal dictionaries, thereby performing character recognition by a known technique. The recognizing methods may be different in the respective terminals.

When handwritten character information recognition is designated by a user operation, a recognition unit 104 is conventionally accessed through the FEP 100 for performing input/output control from the application 1. For the terminal of this embodiment, however, a recognition control unit 4 for controlling a recognition operation is interposed between the FEP 100 and the recognition unit 104. The recognition control unit 4 checks attributes of data to be recognized, and separates the data according to the attributes a name of describer, a terminal ID, and the like are included as the attributes. Characters described by the operator of the terminal 10000 are recognized by the recognition unit 104. As for a description by Mr. A or B, handwritten data from the terminal 5 is sent to the terminal 5, and handwritten data from the terminal 7 is sent to the terminal 7, together with a recognition request message through the communication service such that these data can be recognized at the respective terminals through the network 111. Each handwritten character data is recognized at the terminal where the data is input by using a registered dictionary and a recognition engine. The recognition result is returned through the network 111 again, and all the data from the operator of terminal 10000, Mr. A, and Mr. B are collectively returned to the FEP 100 by the recognition control unit 4. As described above, when recognition is requested to the terminal of the describer, recognition using a personal dictionary suitable for the describer can be performed, thereby improving the recognition rate. The application 1 need not manage whether the result is a recognition result from the recognition unit 104 in the host terminal or a result of recognition from the terminal connected by network 111.

Figure 12:
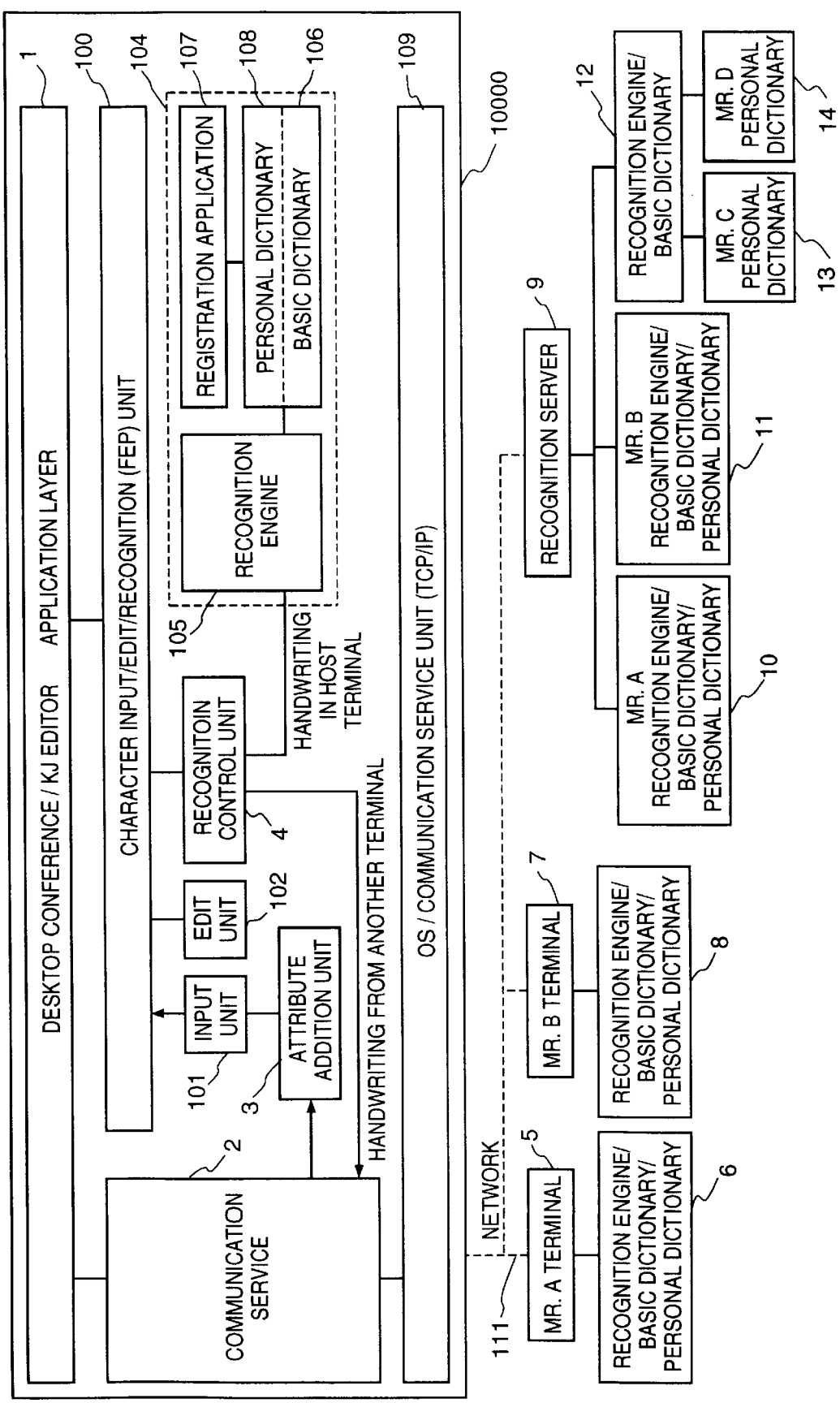
FIG. 12 is a view showing the software configuration of the character recognition system of the first embodiment, which has a recognition server.

In the above example, the handwritten character data is returned to the terminal of the person who has handwritten the character data to use the resource in the terminal of this describer. However, the same effect can be obtained when recognition is entirely requested to a recognition server 9 arranged on the network 111 and having the same recognition method and dictionary as those of each describer. FIG. 12 is a view showing its example. The recognition server 9 is a server having a recognition engine (algorithm), a basic dictionary, and a personal dictionary, which correspond to each operator on the network, and also having a function of performing recognition in accordance with a request from each operator and sending back candidates. In this example, the recognition server 9 has three recognition engines, i.e., a recognition unit 10 for Mr. A, a recognition unit 11 for Mr. B, and a recognition unit 12 common to Messrs. C and D. Messrs. C and D respectively have personal dictionaries 13 and 14. Therefore, terminals where handwritten characters are actually described are not always necessary for recognition if a server capable of performing recognition as in these terminals is available. This server can be effectively used even if written characters are to be recognized after a conference, and the terminals 5 and 7 of Messrs. A and B are already turned off. Note that, in a network having a recognition server a, each terminal need not have a recognition engine. In this case, handwritten characters input from each terminal are always sent to the recognition server 9 and recognized.

Such a system need to have only one recognition engine and one basic dictionary. When a dictionary for each individual who uses the system is additionally provided, handwritten character recognition can be performed.

Figure 2:
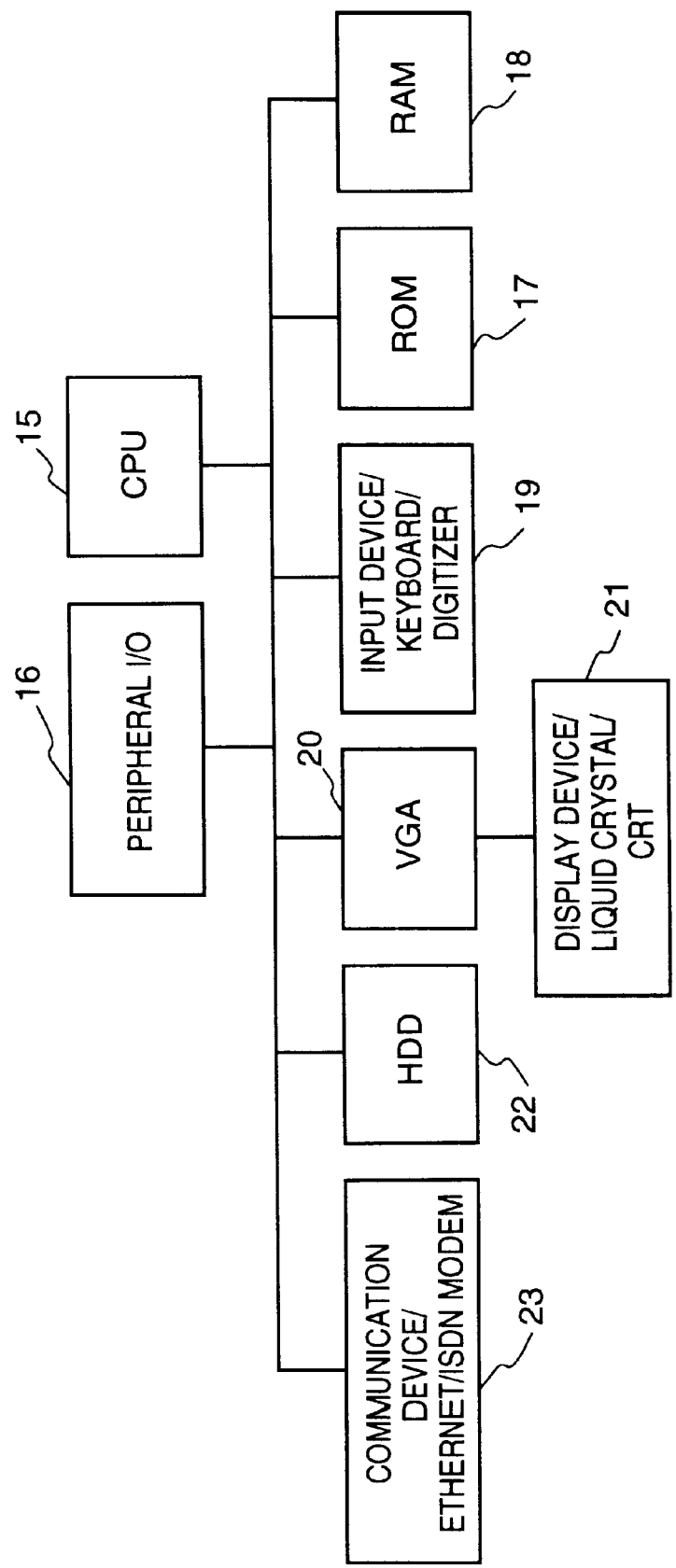
FIG. 2 is a view showing the hardware configuration of a character recognition apparatus according to the first embodiment.

FIG. 2 is a view showing the typical hardware configuration of a terminal. A CPU 15 is a processor such as an "Intel 486" or RISC processor, which performs control/calculation of the entire terminal. A peripheral I/O 16 is a chip set in which functions for controlling the peripheral I/O are integrated. A ROM 17 stores a BIOS or permanent information. A RAM 18 is a memory used for programs or as a work area. An input device 19 is a user input device at least including coordinate input device such as a mouse or a digitizer. A VGA 20 is a display controller for controlling the liquid crystal display (LCD) or CRT of a display device 21. An HDD 22 is a hard disk serving as a device for storing programs and user data. A communication device 23 is a means for performing data transfer with another terminal when an application, e.g., a video conference shown in this embodiment is to be executed, and is compatible with Ethernet or ISDN. Although the above arrangement exemplifies a personal computer, it may also be a system close to a workstation or a system specialized to telewriting.

Figure 3A:
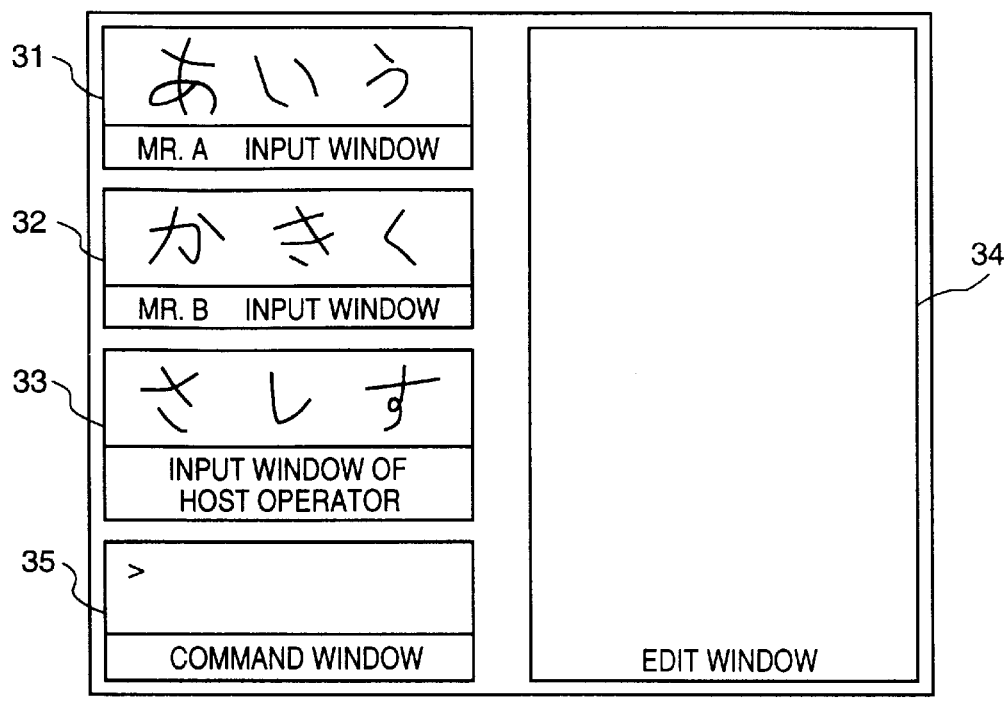
FIGS. 3A and 3B are views showing an application screen.
Figure 3B:
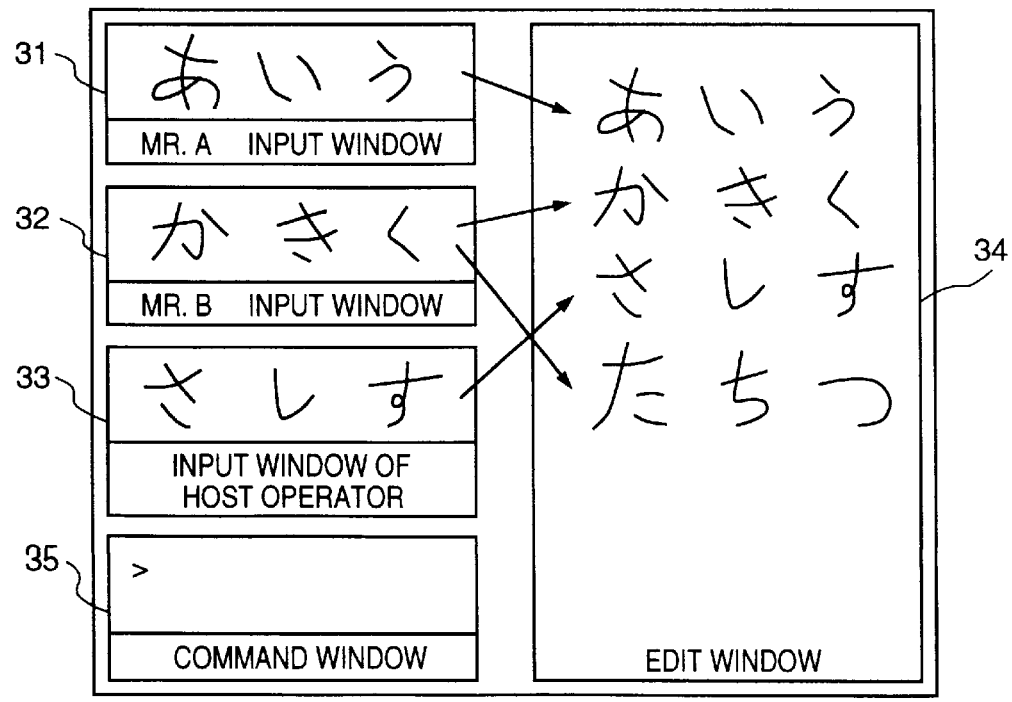

FIGS. 3A and 3B are views showing displayed windows by an online KJ editor as an application. As described in the description of the prior art, in the KJ editor, a conventional method is applied to a teleconference, in which individuals write their ideas on cards, and a host classifies and arranges the cards, thereby proceeding a discussion. The host terminal 1000 as a host can edit the cards described by all participants through their terminals. FIG. 3A is a view showing a state wherein the operators of terminals describe their ideas in windows corresponding to cards, and these data are received and displayed by the terminal 10000 as handwritten characters. A command input window 35 is arranged at the lower left corner while an edit window 34 is arranged on the right side. Handwritten characters input from the terminal 5 are displayed in a window 31, handwritten characters input from the terminal 7 are displayed in a window 32, and handwritten characters input from the terminal 10000 itself are displayed in a window 33. FIG. 3B shows a state wherein the operator of the terminal 10000 cuts out description contents associated with each other from the windows of the respective terminals and pastes them to the edit window 34 (cut and paste). In this example, two ideas are presented by Mr. B although the cards are not illustrated.

Figure 4A:
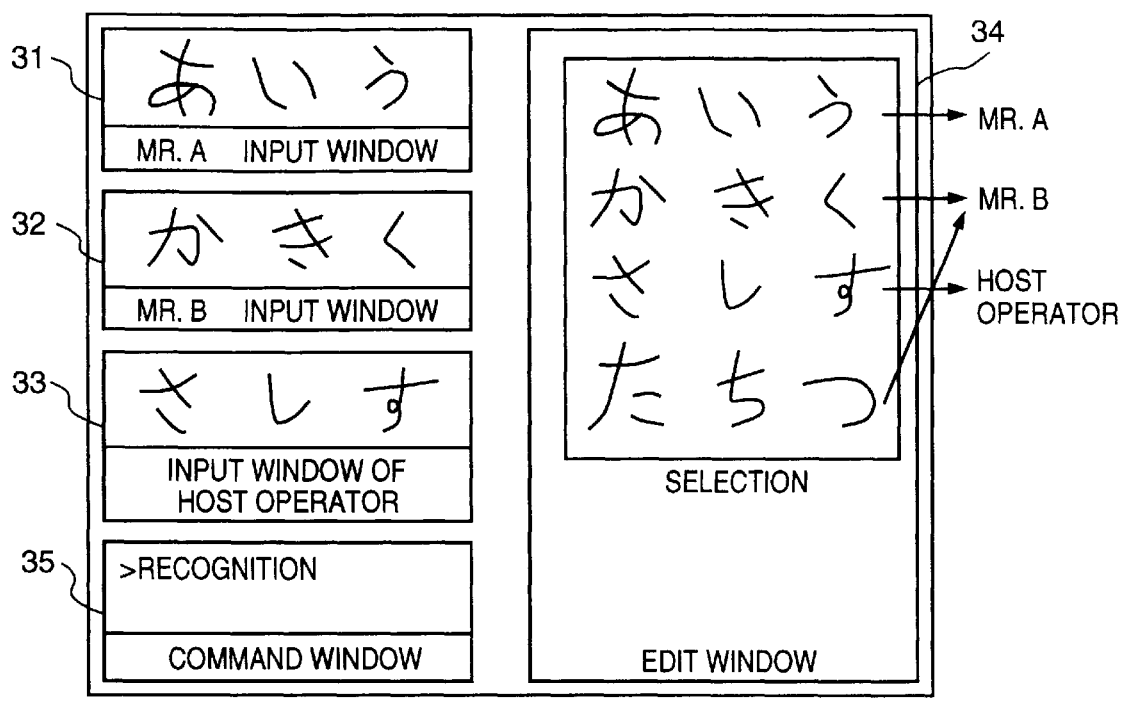
FIGS. 4A and 4B are views showing the application screen.
Figure 4B:
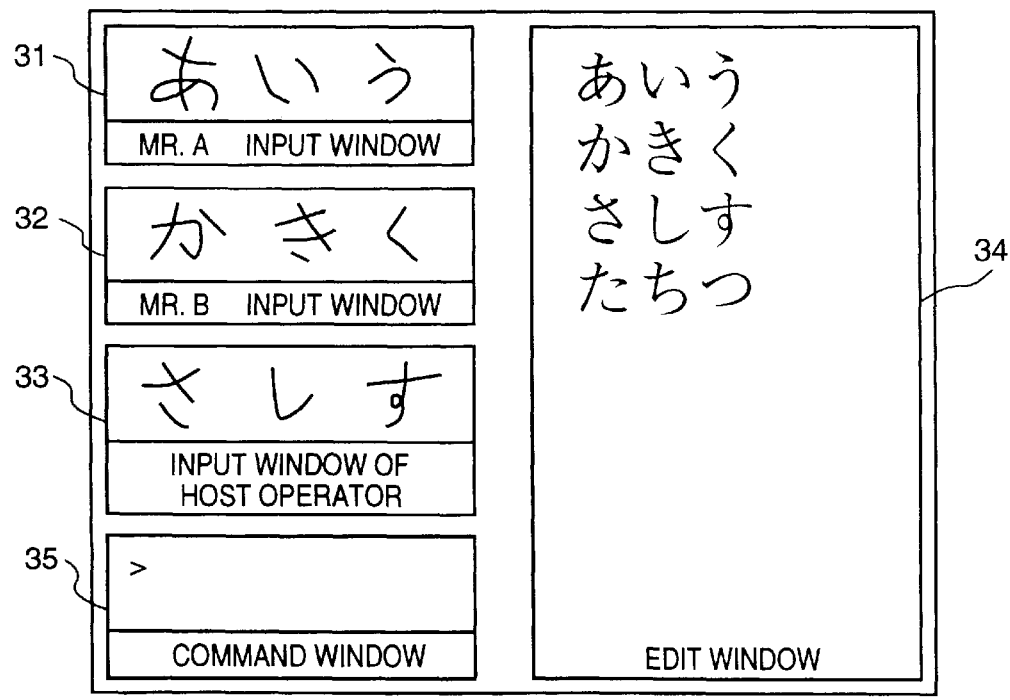

In FIG. 4A, a character string in the edit window 34 is selected, and character recognition is designated in the command window 35. With this operation, character recognition is requested to the corresponding terminal or a recognition server having the same function as that of the terminal such that recognition is performed in accordance with the attribute of the describer of the character string by the corresponding recognizing method. In FIG. 4B, character strings according to recognition results are displayed. Since the character strings are displayed through the FEP 100 of the host terminal, the user cannot know where character recognition has been performed. Upon occurrence of an error in a recognition result, when a character which cannot be recognized correctly is designated, the next candidates are displayed, and a character can be selected therefrom. This function is also provided by the FEP 100, so there is no difference in operability even with different recognizing methods. In this example, a recognition command is input to the command window 35. However, it may also be selected from a menu, or command may also be input with a pen gesture as in a pen computer.

An edit unit 102 can edit both handwritten characters before recognition and recognized characters.

Figure 5A:
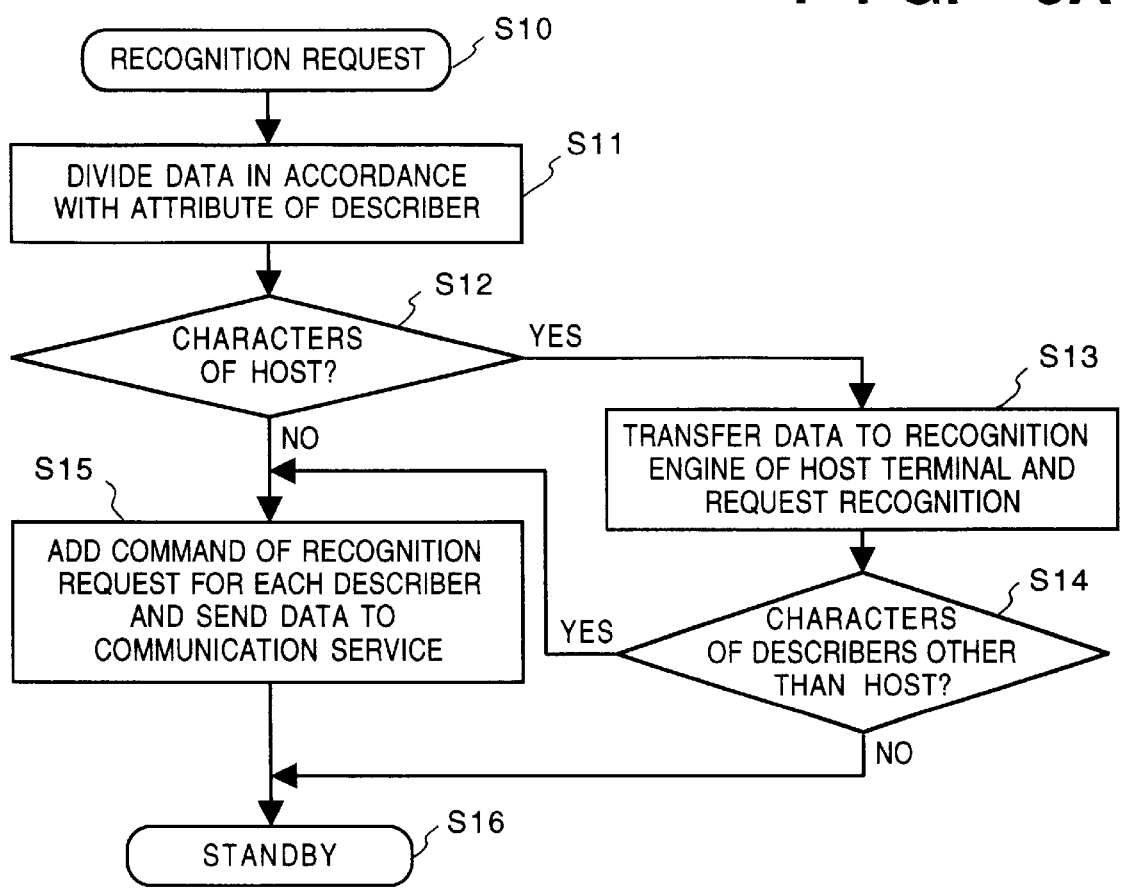
FIGS. 5A and 5B are flow charts of a control sequence of a recognition control unit of the first embodiment.
Figure 5B:
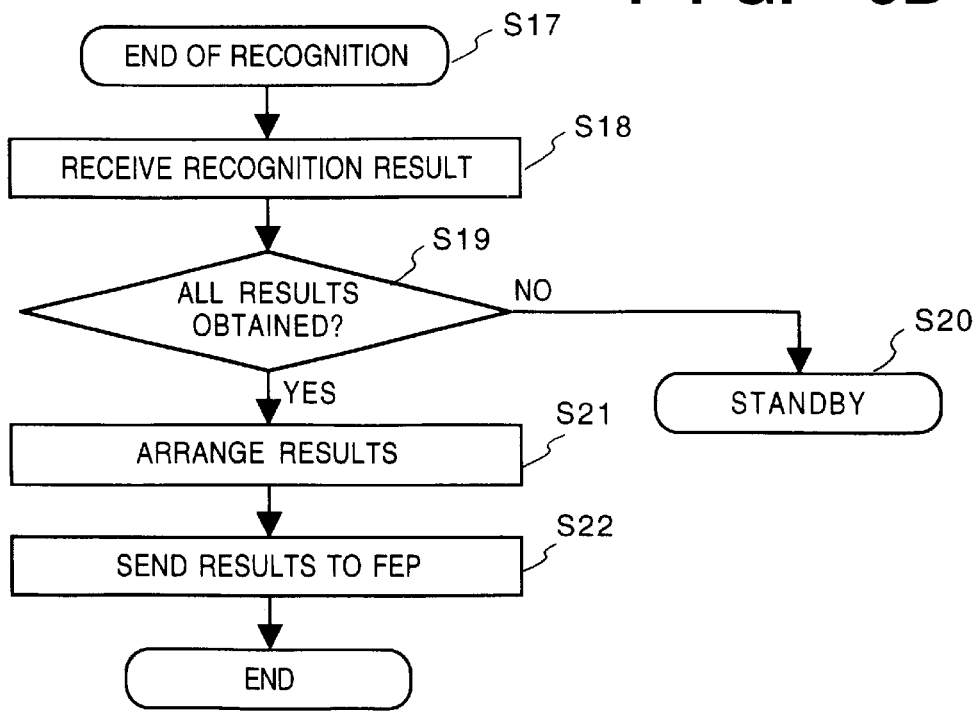

FIGS. 5A and 5B are flow charts showing procedure of the recognition control unit 4 of the host terminal 10000. These procedure can be realized by executing programs in the RAM 18 or the ROM 17 by the CPU 15 shown in FIG. 2.

FIG. 5A is a flow chart showing a sequence for requesting character recognition to each terminal.

Upon generation of a recognition command, recognition is requested to the recognition control unit 4 through the FEP 100 (step S10). At this time, necessary parameters including the attributes such as terminal id or describer name, or pointers of data to be recognized are transferred to the recognition control unit 4. In step Sil, the data to be recognized are classified on the basis of the attributes added to the data. In the example of FIGS. 3A and 3B, three attributes such as "Mr. A", "Mr. B", and "host" are added to classify the describers. "Host" is an attribute added to data input using the host terminal 1000.

In step S12, it is determined whether the characters of "host", i.e., characters input from the terminal 10000 are included in the data to be recognized. If YES in step S12, recognition is requested to the recognition engine 104 in step S13 such that the data of "host" is recognized using a recognition engine 105 and dictionaries 106 and 107 of "host" itself. In step S14, it is determined whether data other than that of "host" is present in the data to be recognized. If YES in step S14, in step S15, recognition is requested to the terminal of the corresponding describer or a terminal capable of recognizing the data using the same recognizing method as that of the describer. Recognition is requested by sending the describer data, the recognition request command, and the pointer of the data to be recognized to the communication service unit 2 as a message. The communication service unit 2 transmits the message in a transfer data format to the target terminal. In step S16, a standby mode for waiting the recognition result is set. In multitasking processing, the task is queued.

In FIG. 5B, the recognition results are gathered. Every time a recognition result is obtained, an event of recognition completion is generated in step S17. In step S18, the recognition result is received from the terminal to which character recognition is requested. The character recognition result from the host terminal itself is obtained when the recognition engine 105 generates the event of recognition completion. Arrival of a result from another requested terminal is detected when the communication service unit 2 interprets arrival of the recognition result and generates the event of recognition completion. In step S19, it is determined whether all requested recognition results are obtained. If NO in step S19, the processing further waits (step S20). If YES in step S19, e.g., the recognition results are rearranged in the order of data to be recognized in step S21. In step S22, the processing result or designating the pointer including the processing result in step S21 is returned to the FEP 100, thereby ending the processing.

Figure 6A:
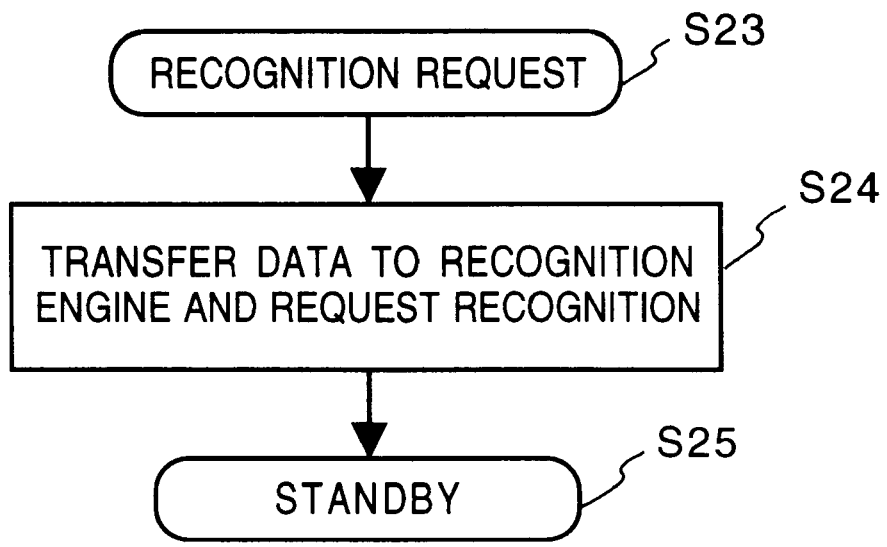
FIGS. 6A and 6B are flow charts of the control sequence of the recognition control unit of the first embodiment.

FIG. 6A is a flow chart of processing when recognition is requested from another terminal. When the communication service unit 2 receives communication data including recognition request, the data is interpreted, and the recognition request is sent to the recognition control unit 4 (step S23). In step S24, the pointer of data to be recognized and the like are transferred to the recognition engine as in a normal recognition operation, and a standby mode is set in step S25.

Figure 6B:
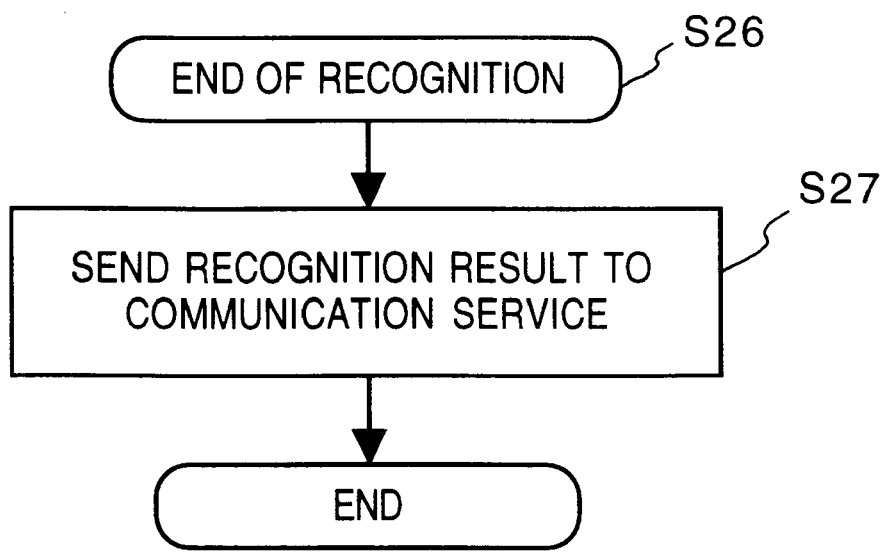

In FIG. 6B, the event of recognition completion is received in step S26 upon obtaining a recognition result. In a normal operation, the recognition result is transferred to the FEP 100. In this case, however, the result is transferred to the communication service unit 2 in step S27, and the result is returned to the terminal which has requested recognition. These procedures are common to the terminals 5 and 7, and terminals other than the host terminal.

Character information to be transferred in accordance with the recognition request may be stroke information including the writing position/time information. When recognition is to be requested to the terminal of a describer who has described characters to be recognized, the identification number (e.g., card number) of a data group, which is transferred upon sending the handwritten character information to the host terminal, and position information representing a portion in the data group (e.g., a rectrangular enclosing the data ot be recognized), which is to be recognized are sent together with the request. The requested terminal may determine the portion in the stroke information in the memory area, which is to be recognized, from the number and the position information of the requested terminal, thereby performing recognition. With this operation, since the stroke information itself need not be sent, the transmission time can be saved.

As described above, the recognition control unit 4 is arranged between the normal FEP 100 and the recognition engine 105. Therefore, the application need not manage whether character recognition is performed in the main body of its own or performed by another terminal. At the same time, recognition can be performed using a recognizing method most suitable for the describer who has written characters to be recognized.

<Second Embodiment>

In this embodiment, instead of requesting character recognition to another terminal, the handwritten character recognizing method of each application participant is formed in the main body of a host terminal in advance, and recognition is requested to the corresponding recognizing method in accordance with the attribute of a describer. FIG. 7 is a view showing the software configuration of the host terminal 2000.

Referring to FIG. 7, a recognition engine 24 is a A's recognition engine for recognizing characters written by Mr. A, which is accompanied with a basic dictionary 25 and a personal dictionary 26. Similarly, B's recognition engine 27, a basic dictionary 28, and a personal dictionary 29 are also mounted in the host terminal. This can be achieved by exchanging the recognizing methods of individuals at the start of an application. The engines and dictionaries sent from the terminals are compiled in the terminal 2000 and set in an executable form. This processing is performed on an assumption that all recognition engines and dictionaries are described in a high-level language (e.g., C language). When all engines and dictionaries are described in an interpretable language, porting is facilitated.

Figure 8A:
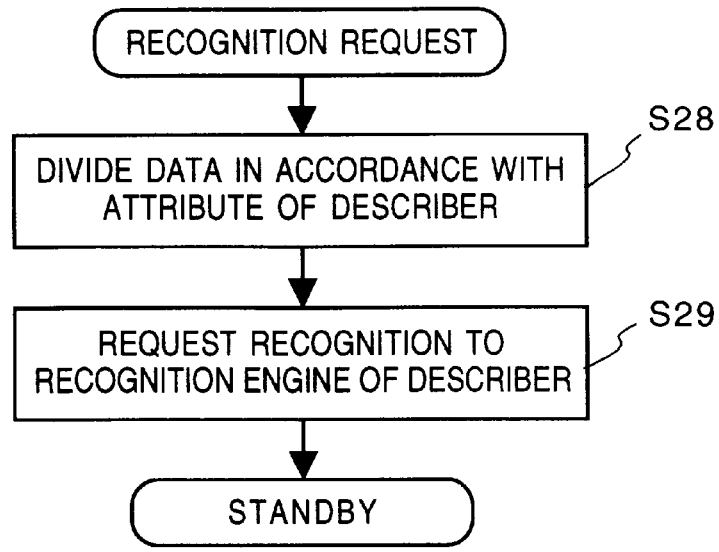
FIGS. 8A and 8B are flow charts of a control sequence of a recognition control unit of the second embodiment.
Figure 8B:
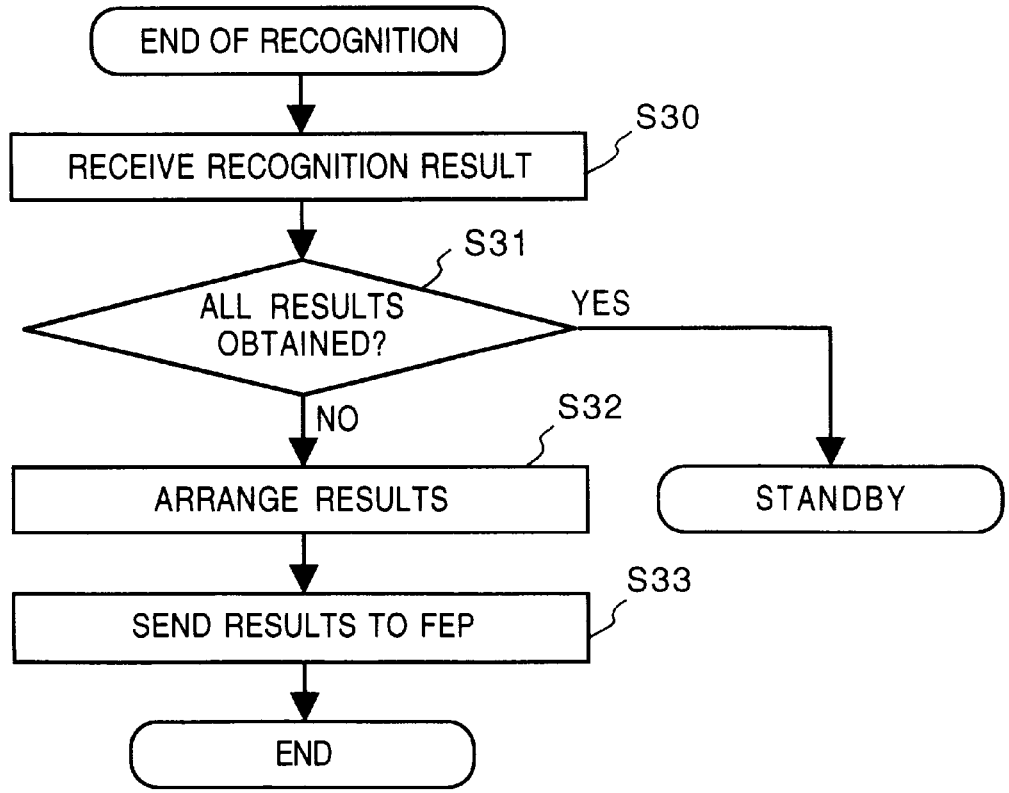

FIGS. 8A and 8B are flow charts of control of a recognition control unit 4 at this time.

When character recognition is to be performed, in step S28, data to be recognized are separated in units of describers. In step S29, information of the data to be recognized is transferred to the recognition engine of each describer, thereby requesting recognition. The recognition engine may perform multitasking or single-tasking. Upon completion of character recognition, the recognition result is received in step S30. In step S31, it is determined whether all results are obtained. If YES in step S30, the results are arranged in step S32, as in the above embodiment. In step S33, the results are transferred to a FEP 100.

With the above arrangement, as far as the host terminal 2000 is operating, character recognition can be performed even when the remaining terminals or the recognition server is turned off. In addition, since communication is not used for character recognition, an increase in traffic of the network can be prevented.

<Third Embodiment>

An example wherein the same recognition engine is used by all terminals will be described. FIG. 9 is a view showing the software configuration. In this case, two methods are available. As one method, personal dictionaries are transferred to a host terminal 3000 at the start of an application or as needed, thereby arranging the dictionaries under the recognition engine. In this case, a Mr. A's personal dictionary 30 and a Mr. B's personal dictionary 31 are arranged. A basic dictionary 106 is commonly used, as a matter of course.

As the other method, the personal dictionaries of terminals are used as if they are arranged under the recognition engine. In this case, personal dictionaries 6', 8', 10', 11', 13, and 14 are respectively arranged in the terminals. Either the terminals or the recognition server may have these personal dictionaries.

Figure 10:
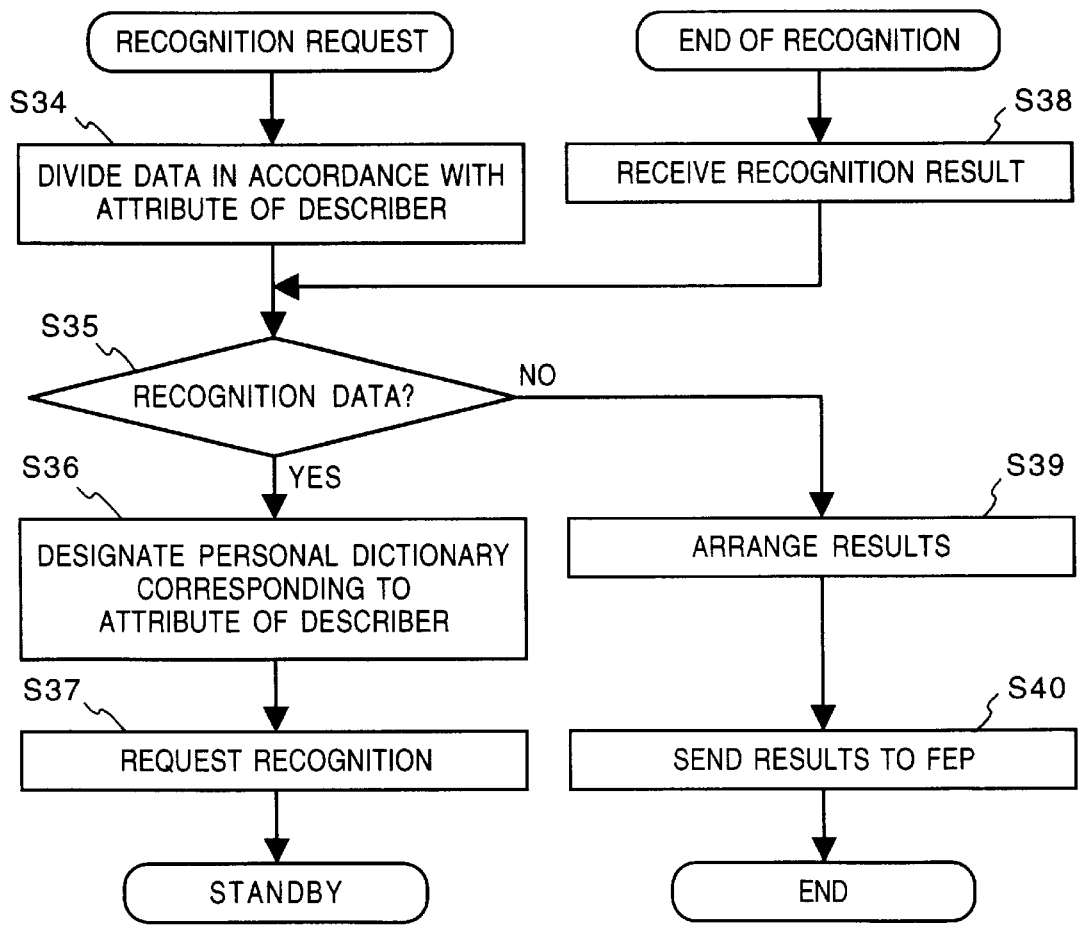
FIG. 10 is a flow chart of a control sequence of a recognition control unit of the third embodiment.

FIG. 10 is a flow chart of a control sequence of a recognition control unit 4 of the terminal 3000 of this embodiment.

Upon reception of a character recognition request, data are separated in units of describer attributes in step S34. In step S35, it is determined whether data to be recognized is present (the data is present first, as a matter of course). If YES in step S35, one of the describers of data to be recognized is selected in step S36, the corresponding personal recognition dictionary is designated, and recognition is requested in step S37. Upon generation of an event of recognition completion, the recognition result is received in step S38. It is determined in step S35 whether the next data to be recognized is present. In this manner, recognition of all data to be recognized is performed while replacing the personal dictionary. If it is determined that no data to be recognized is present, the flow advances to step S39 to arrange the results. In step S40, the results are sent to the FEP. In this description, the recognition engine cannot be multiplexed, and recognition is performed while switching dictionaries. However, as a matter of course, a recognition engine which can be multiplexed may be used, and the personal dictionaries may be set to the corresponding recognition engine modules, respectively, thereby performing multitasking processing.

When the personal dictionary is to be accessed through the network, dictionary data on the network can be read/written as in an incorporated disk through a communication service unit 2 and an OS 109 in step S36. Therefore, the same flow chart can be used.

<Fourth Embodiment>

In the above three embodiments, examples of the recognizing methods for the describers who have written characters to be recognized have been described. In this embodiment, the operations of these methods will be described. The above embodiments cannot always be applied to all communication terminals. The suitable method changes depending on the recognizing method of a terminal. For example, the first embodiment can be applied to recognition between terminals while the second embodiment can be applied to recognition in a certain terminal. When recognition is to be executed after an application is completed, and a terminal to which recognition is to be requested is already turned off or removed from the network, the recognizing method must be replaced depending on a change in status although the terminal is most suitable for receiving a recognition request during execution of the application.

Figure 11:
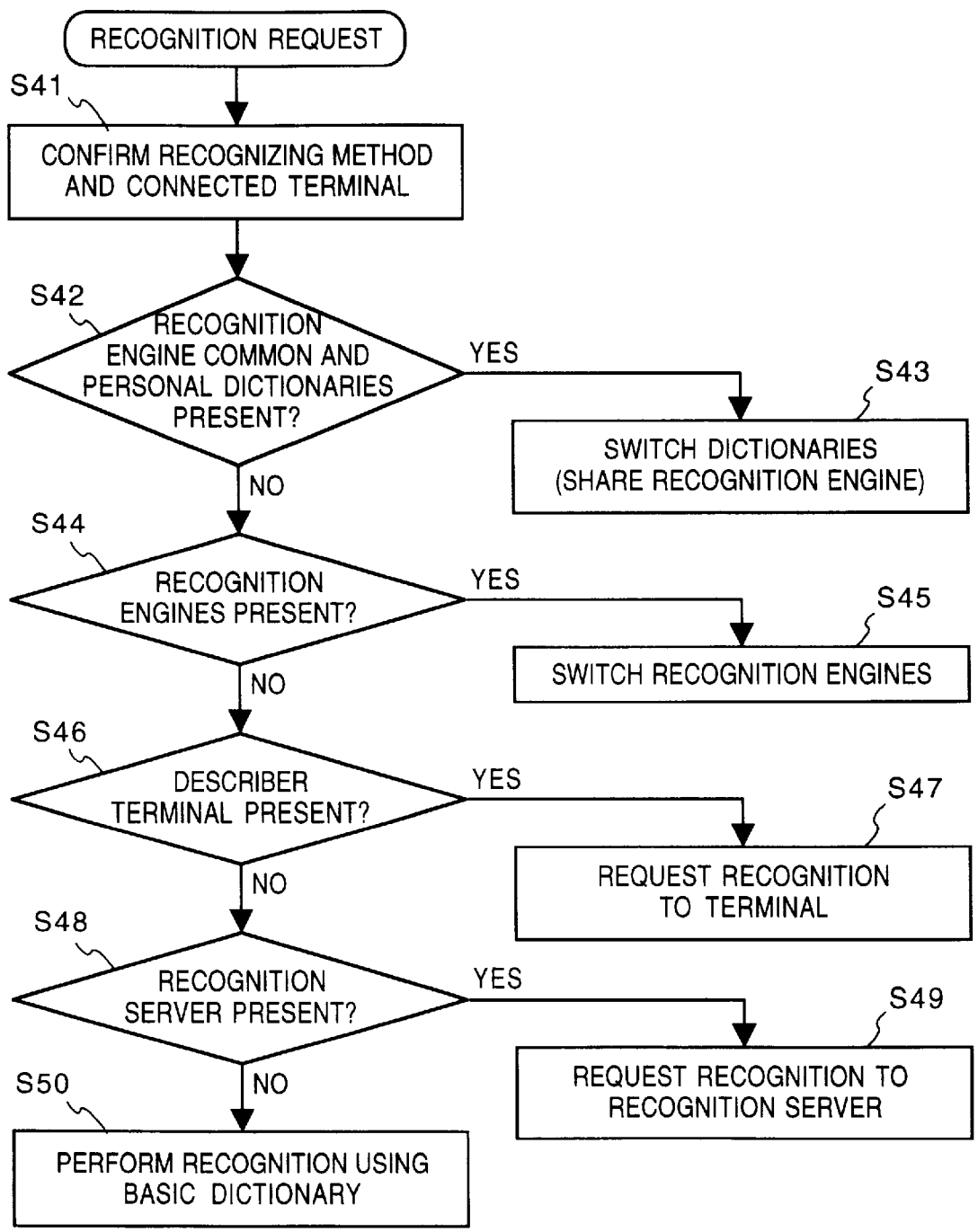
FIG. 11 is a flow chart of a control sequence of a recognition control unit of the fourth embodiment.

FIG. 11 is a flow chart for optimally performing this operation. This processing is executed by a recognition control unit 4.

Upon reception of a character recognition request from a FEP 100, or upon connection of terminals at the start of an application, the recognizing method of each terminal is confirmed, and the current connection state of the terminals is checked in step S41. If it is determined in step S42 that the recognition engine is common to all the terminals, the method of the third embodiment in which only the personal dictionaries are used is selected, and the personal dictionaries are transferred. If the personal dictionaries can be observed, the method in which the personal dictionaries are switched is used in step S43 (the method in third embodiment).

If it is determined in step S44 that recognition engines corresponding to the recognizing methods are present in the host terminal, character recognition is executed by switching the recognition engines in step S45 (the method in second embodiment).

If it is determined in step S46 that the terminal of the describer of handwritten characters is present on the network, recognition is requested to the terminal in step S47. If it is determined in step S48 that a recognition server is present, recognition is requested to the recognition server in step S49 (the method in first embodiment).

As described above, the actual recognition method is replaced depending a method of selecting priority defined by the order of determination or depending on the types of terminals. The above-described priority is an example. Top priority may also be given to recognition request to a terminal.

Recognition using the recognizing method of a describer himself has been described above. If none of these methods can be executed depending on a given situation, recognition must be performed using only the basic dictionary, as in step S50. To avoid such a situation, it is preferable that the personal dictionaries or recognition engines are exchanged in advance such that recognition can be executed even after the application is completed.

Note that the present invention may be applied to a system constituted by a plurality of devices or an apparatus constituted by one device. As is apparent, the present invention can also be applied to a case wherein the above-described function is realized by supplying programs to the system or apparatus.

As described above, the terminal of this embodiment can recognize handwritten characters by a recognition engine and a dictionary, which are optimized in accordance with the features of characters of the describer. Even when data communication by handwritten characters is generated, optimal recognition can be performed, thereby improving the recognition rate.

In addition, since the recognition control unit is arranged between the conventional FEP and the recognition engine, the application can execute character recognition, as in a recognition operation in the main body, without managing the recognition process.

As many apparently widely different embodiments of the present invention can be made without departing from the spirit and scope thereof, it is to be understood that the invention is not limited to the specific embodiments thereof except as defined in the appended claims.

What is claimed is:

1. A character recognizing apparatus, which is connectable with plural terminals, for recognizing a handwritten character from a user using one of the terminals, comprising:
   input means for inputting handwritten character information together with attribute information representing a user inputting the handwritten character information;
   storage means for storing the handwritten character information and the attribute information;
   a plurality of handwritten character recognition means for recognizing the handwritten character information input by said input means, each of the plurality of handwritten character recognition means has a personal dictionary corresponding to a user to recognize the handwritten character information inputted by the user;
   determination means for determining which user has input the handwritten character information in accordance with the attribute information stored by said storage means;
   selection means for selecting a handwritten character string to be recognized from the handwritten character information inputted by said input means; and
   recognition control means for selecting one of the plurality of handwritten character recognition means having a personal dictionary corresponding to the user determined by said determination means and controlling the selected character recognition means so as to recognize the handwritten character string selected by said selection means using the selected personal dictionary.

2. The apparatus according to claim 1, wherein one of the terminals comprises means for managing the input handwritten information.

3. The apparatus according to claim 2, wherein said plurality of character recognition means are distributed to the terminals, and wherein said recognition control means selects one of the plurality of handwritten character recognition means and controls the selected recognition means so as to recognize the handwritten character information by the character recognition means distributed to a terminal through which the handwritten character information to be recognized is inputted.

4. The apparatus according to claim 1, wherein one of the terminals is a recognition server having said plurality of character recognition means, each one of said plurality of character recognition means corresponding to one of the terminals.

5. The apparatus according to claim 1, wherein said plurality of character recognition means includes a character recognition unit for performing character recognition by a predetermined method, and a plurality of personal dictionaries according to features of the handwritten characters, which are referred to by said character recognition unit.

6. The apparatus according to claim 1, further comprising edit means for editing the handwritten characters input by said input means or the characters recognized by said plurality of character recognition means.

7. A method of controlling a character recognizing apparatus, the apparatus comprising a plurality of handwritten character recognition means, each of which has a personal dictionary corresponding to a user, for recognizing handwritten character information inputted by a user using one of a plurality of terminals, the method comprising:
   a storing step of storing the handwritten character information and attribute information in storage;
   a determining step of determining who has input handwritten character information in accordance with attribute information, associated with the user, stored in the storage;
   a selecting step of selecting a handwritten character string to be recognized from the handwritten character informations; and
   a controlling step of selecting one of the plurality of handwritten character recognition means having a personal dictionary corresponding to the user determined in said determining step and controlling the selected character recognition means so as to recognize the handwritten character string selected in said selecting step using the selected personal dictionary.

8. The method according to claim 7, wherein one of the terminals manages the handwritten information input using the terminals.

9. The method according to claim 8, wherein said plurality of character recognition means are distributed to the terminals and one of the plurality of recognition means is selected and controlled in said controlling step so as to recognize the handwritten character information using the character recognition means distributed to the terminal through which the handwritten character information to be recognized was inputted.

10. The method according to claim 7, wherein one of the terminals is a recognition server having said plurality of character recognition means, each one of said plurality of character recognition means corresponding to one of the terminals.

11. The method according to claim 7, wherein said plurality of character recognition means include a character recognition unit for performing character recognition by a predetermined method, and a plurality of personal dictionaries according to features of the handwritten characters, which are referred to by said character recognition unit.

12. A character recognizing system for recognizing a handwritten character information inputted by a user having one of plurality of terminals connected to a network, the system comprising:

storage means for storing handwritten character information and attribute information;

a plurality of handwritten character recognition means for recognizing the handwritten character information, each of the plurality of handwritten character recognition means has a personal dictionary corresponding to a user to recognize the handwritten character information inputted by the user;

determination means for determining which user has input the handwritten character information in accordance with the attribute information stored in said storage means;

selection means for selecting a handwritten character string to be recognized from the handwritten character information inputted by said input means; and recognition control means for selecting one of the plurality of handwritten character recognition means having a personal dictionary corresponding to the user determined by said determination means and controlling the selected character recognition means so as to recognize the handwritten character string selected by said selection means using the selected personal dictionary.

13. The system according to claim 12, wherein one of the terminals comprises means for managing handwritten information input using the terminals.

14. The system according to claim 13, wherein said plurality of character recognition means are distributed to the terminals and said recognition control means selects one of the plurality of handwritten character recognition means and controls the selected recognition means so as to recognize the handwritten character information using the character recognition means distributed to the terminal using which the handwritten character information to be recognized was inputted.

15. The system according to claim 12, wherein one of the terminals is a recognition server having said plurality of character recognition means, each one of said plurality of character recognition means corresponding to one of the terminals.

16. The system according to claim 12, wherein said plurality of character recognition means include a character recognition unit for performing character recognition by a predetermined method, and a plurality of personal dictionaries according to features of the handwritten characters, which are referred to by said character recognition unit.

17. The system according to claim 12, further comprising edit means for editing the handwritten characters input by said input means or the characters recognized by said plurality of character recognition means.

\* \* \* \* \*